Patented July 16, 1940

2,207,911

UNITED STATES PATENT OFFICE 2,207,911

CERAMIC FLUX

Dana A. Cannon, Sacramento, Calif.

No Drawing. Application April 16, 1938,
Serial No. 202,512

1 Claim. (Cl. 106—11)

This invention relates generally to an improvement in the manufacture of vitrified ceramic products, and in particular the invention is directed to an improved ceramic flux and the manner of its use.

At the present time the most commonly used ceramic flux is powdered feldspar and it is used extensively in combination with clay to produce vitrified ware. However, when powdered feldspar is used as the flux, the product must be fired at a temperature not less than cone 9 (2282° F. or 1250° C.) in order to effect proper fusion.

It is the principal object of the present invention to provide a ceramic flux which, when used in proper proportion with clay, will fuse and vitrify fully at cone 4 (2093° F. or 1145° C.) when quick fired, or cone 3 (2129° F. or 1165° C.) in slow commercial firing. This results in substantial saving in time and firing costs.

It is also my purpose to provide a ceramic flux which, while producing proper vitrification at a relatively low temperature, has a range to cone 26 (approximately 3000° F.) which is its melting point. In other words, my improved flux has a range of adaptability, to other elements in the mix, from cones 3 to 26 inclusive.

Further advantages of my improved ceramic flux are:

(a) Produces a dense, heavy, and waterproof product having low absorption characteristics.

(b) The flux is sharp and therefore holds the glaze better when applied to the ware before firing.

(c) The flux burns bright and shiny whereas certain other fluxes burn dark and dull, and there is little if any drying shrinkage and no more than the usual burning shrinkage.

(d) While the flux vitrifies at a relatively low temperature, it maintains the product configuration without distortion when fired to a relatively high heat. This is due to sufficient silica content in the flux.

(e) The flux, due to its crystalline form and little or no drying shrinkage, facilitates the drying of a plastic mass, in which it is incorporated, and without warping or cracking of the product.

A further object of my invention is to provide a ceramic flux which will be exceedingly effective for the purpose for which it is intended to be used.

These objects I accomplish in the manner as will fully appear by a perusal of the following specification and claim.

Referring now in particular to my improved ceramic flux, the material which I use is a natural, volcanic rhyolitic tuff (a light grey sedimentary rock) including, by analysis of a typical specimen, the following constituents and in the following proportions:

| | Per cent |
|---|---|
| Silica (SiO$_2$) | 68.90 |
| Alumina (Al$_2$O$_3$) | 15.78 |
| Titania (TiO$_2$) | 0.28 |
| Ferric oxide (Fe$_2$O$_3$) | 2.54 |
| Manganese oxide (Mn$_3$O$_4$) | 0.10 |
| Lime (CaO) | 2.80 |
| Magnesia (MgO) | 1.72 |
| Loss on Ignition | 4.14 |
| Moisture | 0.46 |
| Alkalies (K$_2$O, Na$_2$O) by difference | 3.28 |

The tuff, after mining thereof, is prepared for use by first grinding it by means of suitable equipment to a dry, granular, or in the presence of water, to a wet, plastic form. Thereafter, if desired, it is subjected to a magnetic separator in order to remove all the iron content which is undesirable if the flux is to be used in the making of certain wares, other than colored ware, where the particles of iron would be noticeable.

After preparation as above, the flux, either in dry or wet form, is employed much in the same manner as other ceramic fluxes. It is included in a mix with fire clay or other body plasticizer; the proportion of flux used apparently is not critical and preferably not less than 10% and ranging upwardly in proportion—depending of course on the characteristics of the fire clay in the mix, and kind of ware desired, cost, etc.

Products prepared from such mix are formed, dried, and fired in the usual manner and in accordance with standard potters practice, except that the firing temperature need not exceed cone 4 to produce a fully fused and vitrified ware having a hard and dense body which is quite waterproof as well as acid proof, and which, due to its hardness, will support a glaze and reduce the tendency of the glaze to chip off as is a common fault in stoneware and pottery. My improved ceramic flux is admirably suited to the manufacture of all types of vitrified ware such as pottery, floor tile, etc., and distortion is reduced to a minimum. The other advantages of such flux have heretofore been set forth in this specification.

From the foregoing description it will be readily seen that I provide a ceramic flux which substantially fulfills the objects of the invention as set forth herein.

While this specification sets forth the present and preferred details of preparing and using the ceramic flux, still in practice such deviations from such detail may be resorted to as do not form a departure from the spirit of the invention, as defined by the appended claim.

Having thus described my invention, what I claim as new and useful and desire to secure by Letters Patent is:

A mix adapted for the manufacture of vitrified ware, said mix including fire clay and a ceramic flux; said flux including, in substantially the following proportions, 68.90% silica, 15.78% alumina, 0.28% titania, 2.54% ferric oxide, 0.10% manganese oxide, 2.80% lime, 1.72% magnesia and 3.28% alkalis.

DANA A. CANNON.